United States Patent
Du et al.

(10) Patent No.: US 12,176,537 B2
(45) Date of Patent: *Dec. 24, 2024

(54) POSITIVE ELECTRODE MATERIAL, PREPARATION METHOD AND USES THEREOF

(71) Applicant: CONTEMPORARY AMPEREX TECHNOLOGY (HONG KONG) LIMITED, Hong Kong (CN)

(72) Inventors: Rui Du, Ningde (CN); Yongchao Liu, Ningde (CN); Sihui Wang, Ningde (CN); Deyu Zhao, Ningde (CN); Na Liu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,387

(22) Filed: Feb. 7, 2024

(65) Prior Publication Data

US 2024/0178385 A1  May 30, 2024

Related U.S. Application Data

(63) Continuation of application No. 17/135,519, filed on Dec. 28, 2020, now Pat. No. 11,942,636, which is a continuation of application No. PCT/CN2019/120585, filed on Nov. 25, 2019.

(30) Foreign Application Priority Data

Dec. 29, 2018  (CN) .......................... 201811642372.9

(51) Int. Cl.
*H01M 4/525* (2010.01)
*H01M 4/485* (2010.01)
*H01M 4/505* (2010.01)
*H01M 10/0525* (2010.01)
*H01M 4/02* (2006.01)

(52) U.S. Cl.
CPC .......... *H01M 4/525* (2013.01); *H01M 4/485* (2013.01); *H01M 4/505* (2013.01); *H01M 10/0525* (2013.01); *H01M 2004/021* (2013.01); *H01M 2004/028* (2013.01)

(58) Field of Classification Search
CPC ...... H01M 4/525; H01M 4/485; H01M 4/505; H01M 10/0525
See application file for complete search history.

(56) References Cited

U.S. PATENT DOCUMENTS

| | | | |
|---|---|---|---|
| 11,942,636 B2* | 3/2024 | Du | H01M 10/0525 |
| 2010/0209771 A1* | 8/2010 | Shizuka | H01M 4/5815 |
| | | | 429/231.95 |
| 2016/0336595 A1 | 11/2016 | Choi | |
| 2017/0155133 A1 | 6/2017 | Lee | |
| 2017/0222223 A1 | 8/2017 | Hong | |
| 2019/0207217 A1* | 7/2019 | Sato | H01M 4/366 |
| 2020/0099048 A1* | 3/2020 | Kim | B01F 27/0724 |
| 2020/0161650 A1 | 5/2020 | Park | |

FOREIGN PATENT DOCUMENTS

| | | |
|---|---|---|
| CN | 100440594 C | 12/2008 |
| CN | 101803073 A | 8/2010 |
| CN | 102150306 A | 8/2011 |
| CN | 103296249 A | 9/2013 |
| CN | 105118967 A | 12/2015 |
| CN | 106711414 A | 5/2017 |
| CN | 106865496 A | 6/2017 |
| CN | 108206281 A | 6/2018 |
| CN | 108269974 A | 7/2018 |
| CN | 108630909 A | 10/2018 |
| CN | 108777295 A | 11/2018 |
| CN | 108878795 A | 11/2018 |
| CN | 110165205 A | 8/2019 |
| KR | 20140050127 A | 4/2014 |

OTHER PUBLICATIONS

The international search report and written opinion of ISA received in the corresponding international application PCT/CN2019/120585, mailed Feb. 27, 2020.
The first office action received in the corresponding Chinese application 201811642372.9, mailed Nov. 30, 2020.
The second office action received in the corresponding Chinese application 201811642372.9, mailed May 6, 2021.
The extended European search report received in the corresponding European application 19901889.6, mailed Aug. 5, 2021.

* cited by examiner

*Primary Examiner* — Olatunji A Godo
(74) *Attorney, Agent, or Firm* — Kilpatrick Townsend & Stockton LLP

(57) ABSTRACT

The present application relates to the electrochemical field, and in particular, to a positive electrode material, and an electrochemical energy storage apparatus having thereof. The present application provides a positive electrode material, including a substrate. The substrate includes secondary particles containing primary particles. A surface of the substrate is coated with an oxide coating layer. The oxide coating layer comprises a coating element, and the coating element is selected from one or more of Al, Ba, Zn, Ti, Zr, Mg, W, Y, Si, Sn, B, Co, or P. The electrochemical energy storage apparatus comprises the foregoing positive electrode material.

20 Claims, No Drawings

POSITIVE ELECTRODE MATERIAL, PREPARATION METHOD AND USES THEREOF

CROSS REFERENCE TO RELATED APPLICATIONS

This application is a continuation application of U.S. application Ser. No. 17/135,519, filed Dec. 28, 2020, which is a continuation application of PCT Patent Application No. PCT/CN2019/120585, filed on Nov. 25, 2019, which claims priority to Chinese Patent Application No. 201811642372.9, filed on Dec. 29, 2018, and entitled "POSITIVE ELECTRODE MATERIAL, PREPARATION METHOD THEREFOR, AND USE THEREOF", all of which are incorporated herein by reference in their entirety.

TECHNICAL FIELD

The present application relates to the electrochemical field, and in particular, to a positive electrode material, and a preparation method and uses thereof.

BACKGROUND

With continuous escalation of the energy crisis and environmental problems, it is urgent to develop new green energy. Lithium-ion batteries have the advantages of a high specific energy, a wide temperature range in which the batteries are applicable, a low self-discharge rate, a long cycle life, good safety performance, and no pollution, and have been used in various fields. Attempts are made gradually all over the world to use a lithium-ion battery as an energy system of automobiles in place of traditional combustion engines. However, lithium iron phosphate ($LiFePO_4$), low-nickel ternary material ($LiNi_{1/3}Co_{1/3}Mn_{1/3}O_2$), and the like that are commonly used at present are unable to fully meet the requirements of a motive power battery on an energy density of a positive electrode material of a lithium-ion battery due to limitations of inherent properties of the material. A higher nickel content in a high-nickel ternary positive-electrode material increases the energy density of the batteries. Therefore, the high-nickel ternary positive-electrode material is one of the main research topics of the motive power batteries currently. However, with the increase of the nickel content, direct side reactions between the positive electrode active material and an electrolytic solution are also escalated drastically, and the cycle performance is deteriorated drastically, thereby becoming one of the bottlenecks of commercial mass production.

SUMMARY

In view of disadvantages of the prior art, an objective of the present application is to provide a positive electrode material and a lithium-ion battery that adopts the positive electrode material. By providing a positive electrode material characterized by a relatively low powder resistivity and a relatively low amount of residual lithium on a surface of the material, the present application reduces a direct current impedance, suppresses gassing of the lithium-ion battery, and ensures superior cycle performance and rate performance of high-capacity batteries.

To achieve the foregoing objective and other relevant objectives, an aspect of the present application provides a positive electrode material, including a substrate. The substrate includes secondary particles containing primary particles. A molecular formula of the substrate is $Li_xNi_yCo_zM_kMe_pO_rA_m$, $0.95 \leq x \leq 1.05$, $0.50 \leq y \leq 0.98$, $0 \leq z \leq 0.3$, $0 \leq k \leq 0.4$, $0 \leq p \leq 0.05$, $1 \leq r \leq 2$, $0 \leq m \leq 2$, $m+r \leq 2$, M is Mn and/or Al, Me is selected from one or more of Zr, Zn, Cu, Cr, Mg, Fe, V, Ti, Sr, Sb, Y, W, Nb, or Al, and A is selected from one or more of F, Cl, or Br.

A surface of the substrate is coated with an oxide coating layer, and the oxide coating layer includes a coating element, and the coating element is selected from one or more of Al, Ba, Zn, Ti, Zr, Mg, W, Y, Si, Sn, B, Co, or P.

A powder resistivity ρ of the positive electrode material under a 12 MPa pressure is 10 Ω*cm-5000 Ω*cm, more specifically 10 Ω*cm-2000 Ω*cm.

Another aspect of the present application provides an electrochemical energy storage apparatus, including the positive electrode material.

Compared with the prior art, the present application achieves the following beneficial effects:

By doping a high-nickel substrate and coating the surface of the substrate of the positive electrode material, the present application controls a powder resistivity of the positive electrode material to be in an appropriate range, reduces a specific surface area of the positive electrode active material, decreases the amount of residual lithium on the surface, mitigates polarization of the positive electrode material, reduces a direct current impedance of a lithium-ion battery, effectively reduces side reactions between the positive electrode material and an electrolytic solution, suppresses battery gassing, increases a volumetric energy density of the battery, and improves cycle performance and rate performance.

DESCRIPTION OF EMBODIMENTS

The following describes in detail a lithium-ion battery and a preparation method thereof according to the present application.

A first aspect of the present application provides a positive electrode material, including a substrate. The substrate includes secondary particles containing primary particles. A molecular formula of the substrate is $Li_xNi_yCo_zM_kMe_pO_rA_m$, $0.95 \leq x \leq 1.05$, $0.70 \leq y \leq 0.98$, $0 \leq z \leq 0.2$, $0 \leq k \leq 0.2$, $0 \leq p \leq 0.05$, $1 \leq r \leq 2$, $0 \leq m \leq 2$, $m+r \leq 2$, M is Mn and/or Al, Me is selected from one or more of Zr, Zn, Cu, Cr, Mg, Fe, V, Ti, Sr, Sb, Y, W, Nb, or Al, and A is selected from one or more of F, Cl, or Br.

A surface of the substrate is coated with an oxide coating layer, and the oxide coating layer includes a coating element, and the coating element is selected from one or more of Al, Ba, Zn, Ti, Zr, Mg, W, Y, Si, Sn, B, Co, or P.

A powder resistivity ρ of the positive electrode material under a 12 MPa pressure is 10 Ω*cm-5,000 Ω*cm.

Generally, a layered lithium nickel cobalt manganese oxide has a relatively high theoretical specific capacity per gram due to a high content of Ni. However, because a valence state of nickel is unstable, a relative content of $Ni^{4+}$ increases with the increase of Ni. Consequently, side reactions of an electrolytic solution occur on a surface of the positive electrode material. The substrate in the present application includes secondary particles containing primary particles. With a surface of the substrate being coated with an oxide coating layer, the surface of the high-nickel lithium transition metal oxide is effectively passivated, the electrolytic solution is isolated, residual lithium on an active substance surface is reduced, and battery gassing is suppressed. If the oxide used is a simple oxide of a high ion conductivity and a relatively low electron conductivity, polarization of the positive electrode material will escalate, and cycle performance of the battery will deteriorate. Therefore, in the present application, the surface of the substrate is coated with an oxide for surface modification, and a specific doping element is also applied, with a dopant dosage being optimized. The powder resistivity of the positive electrode material is controlled to be 10 $\Omega$*cm-5,000 $\Omega$*cm, so that an intrinsic electron conductivity of the positive electrode material is relatively high. In addition, the residual lithium and other impurities on the surface are reduced. This effectively reduces side reactions between the material and the electrolytic solution, and decreases an interface resistance between the electrolytic and a positive electrode active substance. In this way, polarization of the battery is mitigated significantly, and the cycle performance and the rate performance of the battery are improved.

In some implementations of the present application, a range of the powder resistivity $\rho$ of the positive electrode material under a 12 MPa pressure may be: 10 $\Omega$*cm-5,000 $\Omega$*cm, 10 $\Omega$*cm-3,000 $\Omega$*cm, 10 $\Omega$*cm-2,000 $\Omega$*cm, 10 $\Omega$*cm-1,000 $\Omega$*cm, 10 $\Omega$*cm-500 $\Omega$*cm, 10 $\Omega$*cm-100 $\Omega$*cm, 10 $\Omega$*cm-50 $\Omega$*cm, 10 $\Omega$*cm-30 $\Omega$*cm, 30 $\Omega$*cm-50 $\Omega$*cm, 50 $\Omega$*cm-100 $\Omega$*cm, 100 $\Omega$*cm-200 $\Omega$*cm, 200 $\Omega$*cm-300 $\Omega$*cm, 300 $\Omega$*cm-500 $\Omega$*cm, 500 $\Omega$*cm-1,000 $\Omega$*cm, 1,000 $\Omega$*cm-2,000 $\Omega$*cm, 2,000 $\Omega$*cm-3,000 $\Omega$*cm, or 3,000 $\Omega$*cm-5,000 $\Omega$*cm.

In the present application, the powder resistivity of the positive electrode active substance under a 12 MPa pressure may be measured by using a known powder resistivity measurement method. For example, the powder resistivity of the positive electrode active substance under a 12 MPa pressure is measured by using a four-probe method. The test method includes: adding 0.4 g of positive electrode active substance powder to a sample mold (with an inner diameter of 11.28 mm); using a mechanical press to exert a 12 MPa pressure on the powder; and reading, after the pressure is stable, the powder resistivity of the positive electrode active substance under a 12 MPa pressure by using a resistivity meter.

In the positive electrode material provided in the present application, a content Mv of the coating element per unit volume of the positive electrode material may be 400 $\mu g/cm^3$-15,000 $\mu g/cm^3$, 400 $\mu g/cm^3$-12,000 $\mu g/cm^3$, 800 $\mu g/cm^3$-10,000 $\mu g/cm^3$, 400 $\mu g/cm^3$-600 $\mu g/cm^3$, 600 $\mu g/cm^3$-800 $\mu g/cm^3$, 800 $\mu g/cm^3$-1,000 $\mu g/cm^3$, 1,000 $\mu g/cm^3$-2,000 $\mu g/cm^3$, 2,000 $\mu g/cm^3$-4,000 $\mu g/cm^3$, 4,000 $\mu g/cm^3$-6,000 $\mu g/cm^3$, 6,000 $\mu g/cm^3$-8,000 $\mu g/cm^3$, 8,000 $\mu g/cm^3$-10,000 $\mu g/cm^3$, 10,000 $\mu g/cm^3$-12,000 $\mu g/cm^3$, or 12,000 $\mu g/cm^3$-15,000 $\mu g/cm^3$. Exemplarily, the content Mv of the coating element per unit volume of the positive electrode material is 800 $\mu g/cm^3$-10,000 $\mu g/cm^3$. When the content Mv of the coating element per unit volume of the positive electrode material is in the above range, the present application both ensures surface modification effects of the secondary particles and suppresses polarization of the positive electrode material in a system in which particles of different sizes are distributed, effectively suppresses gassing of a high-capacity battery, and improves the cycle performance and the rate performance.

Exemplarily, in the positive electrode material provided in the present application, a ratio of the powder resistivity $\rho$ of the positive electrode material to the content Mv of the coating element per unit volume of the positive electrode material satisfies: $\rho/Mv \leq 1$ ($\Omega$*cm$^4$/$\mu$g), $\rho/Mv \leq 0.8$ ($\Omega$*cm$^4$/$\mu$g), $\rho/Mv \leq 0.6$ ($\Omega$*cm$^4$/$\mu$g), or $\rho/Mv \leq 0.5$ ($\Omega$*cm$^4$/$\mu$g). When calculating the ratio above, the unit of the powder resistivity of the positive electrode material may be $\Omega$*cm, and the unit of the content of the coating element per unit volume of the positive electrode material may be $\mu g$*cm$^{-3}$. Generally, the lower the ratio of $\rho/Mv$, the higher the content of the coating element, the less the overall polarization of the positive electrode material, the fewer the side reactions, and the better the cycle performance.

In the positive electrode material provided in the present application, the coating element is selected from at least two or more of Al, Ba, Zn, Ti, Zr, Mg, W, Y, Si, Sn, B, Co, P, or the like. In the present application, the surface of the substrate may be coated with an oxide coating layer. The oxide coating layer may be located on the surface of the secondary particles. The coating element in the oxide coating layer may be distributed on the surface of the secondary particles. In the oxide coating layer on the surface of the substrate of the positive electrode material, the coating element may exist in the form of an oxide thereof. The oxide coating layer may include an oxide formed by at least two coating elements described above, thereby increasing stability of adhesion of a coating layer to the surface of the substrate, achieving both ion conductivity and electron conductivity of the coating layer, and reducing the impact of the coating layer on the polarization of the positive electrode material. This effectively avoids direct contact between a high-nickel substrate and the electrolytic solution, reduces the side reactions between the substrate and the electrolytic solution, avoids a large amount of gas generated during cycles, and ensures a relatively low impedance and superior cycle performance and rate performance of the battery.

In the positive electrode material provided in the present application, the coating element is distributed on the surface of at least a part of the primary particles inside the secondary particles, and this part of the coating element may exist in the form of an oxide thereof. The coating element may also be distributed at a grain boundary between adjacent primary particles, and this part of the coating element may exist in the form of an oxide thereof. A secondary particle is formed by closely packing several primary particles. During a cycle, the secondary particles expand and contract in volume, thereby increasing spacing between the primary particles in the secondary particles, exposing uncoated fresh surfaces massively, and thus posing risks of side reactions with the electrolytic solution. In the present application, the surface of the secondary particles is coated with a coating layer, and a further coating is formed on the surface of at least a part of the primary particles inside the secondary particles or at the grain boundary between adjacent primary particles, thereby enhancing an internal packing density of the secondary particles, increasing an internal acting force between the primary particles, and further suppressing battery gassing during cycles.

In the positive electrode material provided in the present application, the content of the coating element in the oxide coating layer may be at least 60 wt %, at least 70 wt %, at least 80 wt %, or at least 90 wt % of the total mass of the coating element in the positive electrode active material, more specifically 80 wt %-98 wt %. In the present application, the surface of the secondary particles contacts the electrolytic solution first and has a relatively larger surface area. Therefore, when the mass of the coating element distributed on the surface of the secondary particles accounts for a specific percentage or a higher percentage in the total mass of the coating element in the positive electrode active material, the surface of the high-nickel positive electrode material is modified significantly, and the effect of suppressing battery gassing is superior.

The positive electrode material provided in the present application is a lithium transition metal oxide. In a preparation process, a specific content of elements is segregated. Therefore, in the molecular formula of the positive electrode material, the lithium element may be deficient or rich in lithium to some extent. When a relative content of the lithium element is $0.95 \leq x \leq 1.05$, little impact is exerted on the capacity of the positive electrode material. Optionally, the relative content of the lithium element may be $0.95 \leq x \leq 1$, or $1 \leq x \leq 1.05$.

In the positive electrode material provided in the present application, the substrate is a lithium transition metal oxide with a higher nickel content. In the molecular formula of the substrate, $0.50 < y \leq 0.98$, $0 \leq z \leq 0.3$, $0 \leq k \leq 0.4$, and $0 \leq p \leq 0.05$. Specifically, the substrate may be $LiNi_{0.5}Co_{0.2}Mn_{0.3}O_2$, $LiNi_{0.5}Co_{0.25}Mn_{0.25}O_2$, $LiNi_{0.55}Co_{0.15}Mn_{0.3}O_2$, $LiNi_{0.55}Co_{0.1}Mn_{0.35}O_2$, $LiNi_{0.55}Co_{0.05}Mn_{0.4}O_2$, $LiNi_{0.6}Co_{0.2}Mn_{0.2}O_2$, $LiNi_{0.75}Co_{0.1}Mn_{0.15}O_2$, $LiNi_{0.8}Co_{0.1}Mn_{0.1}O_2$, $LiNi_{0.85}Co_{0.05}Mn_{0.1}O_2$, $LiNi_{0.88}Co_{0.05}Mn_{0.07}O_2$, $LiNi_{0.9}Co_{0.05}Mn_{0.05}O_2$, or a material obtained by partially substituting or modifying the foregoing substance with Me and/or A, where Me is selected from one or more of Zr, Zn, Cu, Cr, Mg, Fe, V, Ti, Sr, Sb, Y, W, Nb, or Al, and A is selected from one or more of F, Cl, or Br. A positive electrode active material that contains a relatively high nickel content is selected as the positive electrode active material in the present application. With a higher relative content of the Ni element, the theoretical specific capacity per gram of the material is higher, and can effectively increase the volumetric energy density of the battery. By controlling compactness of the surface of the secondary particles of the high-nickel positive electrode active material and compressive strength of a single particle, the present application effectively solves the gassing problem of high-capacity batteries during cycles and increases the energy density and service life of the batteries. Exemplarily, in the structural formula of the substrate in the positive electrode material provided in the present application, $0.80 \leq y \leq 0.98$, $0 \leq z \leq 0.1$, $0 \leq k \leq 0.1$, $0 \leq p \leq 0.03$. When the substrate of the positive electrode material in the present application is a lithium nickel cobalt manganese oxide with a Ni content of 0.80-0.98, the residual lithium content on the surface is higher. Therefore, the content of the coating layer needs to be increased, or the coating layer needs to be a metal oxide that is more inert. The impact on the impedance of the positive electrode material is more significant if the content of the coating layer is increased or the coating layer is a metal oxide that is more inert. By synergistically adjusting the elements and element content in a doping and coating process and controlling the powder resistivity of the positive electrode material, the present application ensures a higher volumetric energy density and a higher mass energy density, good effects of suppressing gassing, and superior cycle performance and rate performance of the batteries.

In the positive electrode material provided in the present application, the Dv50 of the secondary particles may be 5 μm-18 μm, and a particle diameter range of the primary particles may be 0.1 μm-1 μm. The Dv50 generally means a particle diameter existent when a cumulative volume distribution percentage of a sample reaches 50%. Specifically, the Dv50 of the secondary particles may be 5 μm-18 μm, 6 μm-15 μm, 8 μm-14 μm, 9 μm-11 μm, 10 μm-12 μm, 12 μm-14 μm, 14 μm-16 μm, or 16 μm-18 μm. The particle diameter range of the primary particles may be 0.1 μm-1 μm, 0.1 μm-0.9 μm, 0.2 μm-0.8 μm, or 0.2 μm-0.5 μm.

In the positive electrode material provided in the present application, a specific surface area of the positive electrode material is 0.1 $m^2/g$-0.8 $m^2/g$. Specifically, the specific surface area of the positive electrode material may be 0.1 $m^2/g$-0.8 $m^2/g$, 0.1 $m^2/g$-0.2 $m^2/g$, 0.2 $m^2/g$-0.3 $m^2/g$, 0.3 $m^2/g$-0.4 $m^2/g$, 0.4 $m^2/g$-0.5 $m^2/g$, 0.5 $m^2/g$-0.6 $m^2/g$, 0.6 $m^2/g$-0.7 $m^2/g$, or 0.7 $m^2/g$-0.8 $m^2/g$.

In the present application, an average particle diameter and a Brunauer-Emmett-Teller (BET) specific surface area of the positive electrode material are set within the above range to effectively reduce the contact area between the positive electrode material and the electrolytic solution. Even under the effect of a high voltage or high oxidization, few side reactions of the electrolytic solution occur on the surface of the positive electrode active substance. This effectively suppresses battery gassing, reduces heat emission, and effectively improves the safety performance and the cycle performance of the batteries. In addition, a path for intercalating and deintercalating lithium ions in the particles of the positive electrode active substance during charging and discharging is not too long, thereby further improving kinetic performance of the batteries.

In the positive electrode material provided in the present application, the content of $Li_2CO_3$ in the residual lithium on the surface of the positive electrode material (that is, the content for which the mass of $Li_2CO_3$ in the residual lithium on the surface of the substrate accounts in the total mass of the positive electrode material) is less than 3,000 ppm. Exemplarily, the content of $Li_2CO_3$ in the residual lithium is less than 2,000 ppm. The content of LiOH in the residual lithium on the surface of the positive electrode material (that is, the content for which the mass of LiOH in the residual lithium on the surface of the positive electrode material accounts in the total mass of the positive electrode) is less than 5,000 ppm. Exemplarily, the content of LiOH in the residual lithium is less than 4,000 ppm. The substrate of the positive electrode material in the present application is a lithium nickel cobalt manganese oxide that contains a high nickel content, and generally a relatively high residual lithium content exists on the surface of the substrate. The coating layer disposed on the surface of the substrate effectively reduces the residual lithium content on the surface, but leads to much polarization of the positive electrode material. The positive electrode material with a residual surface lithium content falling within the above range effectively mitigates gassing and polarization, and achieves a high-capacity battery with insignificant gassing and superior cycle performance and rate performance.

Exemplarily, the content of $Li_2CO_3$ in the residual lithium on the surface of the positive electrode material is less than the content of LiOH. On the surface of the positive electrode material, the residual surface lithium (LiOH, $Li_2O$) is prone to react with moisture and $CO_2$ in the air to generate a product such as $Li_2CO_3$. The higher the $Li_2CO_3$ content, the more violent the reaction, and the severer the gassing problem of the manufactured battery.

A second aspect of the present application provides a method for preparing the positive electrode material according to the first aspect of the present application. The method includes:

providing a substrate; and forming a coating layer on a surface of the substrate.

The method for preparing the positive electrode material according to the present application may include: providing a substrate. The method for providing the substrate is known to those skilled in the art. For example, the method for providing the substrate may include: mixing and sintering ingredients of the substrate to generate the substrate. Those skilled in the art may select appropriate ingredients and mixing ratios of the ingredients in the substrate according to elemental composition of the substrate. For example, the ingredients of the substrate may include a ternary material precursor of nickel, cobalt, manganese and/or aluminum, a lithium source, an M source, an Me source, an A source. The ratio between the ingredients is generally determined with reference to the ratio between the elements in the substrate. More specifically, the ternary material precursor may be, but without limitation, $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2 \cdot 0.1Al_2(OH)_3$, or $0.9Ni_{0.9}Co_{0.05}Mn_{0.05}(OH)_2 \cdot 0.1Al_2(OH)_3$. The lithium source may be a lithium-containing compound. The lithium-containing compound may be, but without limitation, one or more of $LiOH \cdot H_2O$, $LiOH$, $Li_2CO_3$, $Li_2O$. Generally, the Me source may be a compound containing an Me element. The compound containing an Me element may be one or more of an oxide, a nitrate, or a carbonate, each containing at least one of Zr, Zn, Cu, Cr, Mg, Fe, V, Ti, Sr, Sb, Y, W, Nb, or Al. The A source may be a compound containing the A element. The compound containing the A element may be, but without limitation, one or more of LiF, NaCl, or NaBr. For another example, conditions of the sintering may be 800° C. and an oxygen concentration greater than or equal to 20%.

The method for preparing the positive electrode material according to the present application may further include: forming a coating layer on the surface of the substrate. The method for forming a coating layer on the surface of the substrate is known to those skilled in the art. For example, the method for forming a coating layer on the surface of the substrate may include: sintering the substrate under a condition that a compound containing a coating element exists, so that a coating layer is formed on the surface of the substrate. Those skilled in the art may, according to the composition of the coating layer and parameters such as the powder resistivity of the substrate, select appropriate types, mixing ratios, sintering conditions, and the like of the compound containing the coating element. For example, the compound containing the coating element may be, but without limitation, one or more of $Al_2O_3$, $ZnO$, $ZrO_2$, $TiO_2$, $MgO$, $WO_3$, $Y_2O_3$, $CO_2O_3$, $Ba(NO_3)_2$, $Co_2O_3$, $P_2O_5$, or $H_3BO_3$. For another example, the dosage of the coating element may be 0.01 wt %-0.5 wt % of the mass of the substrate. For still another example, the sintering condition may be high-temperature sintering under 200° ° C.-700° C.

A third aspect of the present application provides an electrochemical energy storage apparatus, including the positive electrode positive material according to the first aspect of the present application.

It needs to be noted that the electrochemical energy storage apparatus according to the present application may be a super capacitor, a lithium-ion battery, a lithium metal battery, a sodium-ion battery, or the like. In the embodiments of the present application, only an embodiment in which the electrochemical energy storage apparatus is a lithium-ion battery is described, but the present application is not limited thereto.

The lithium-ion battery may include a positive electrode plate, a negative electrode plate, a separator located between the positive electrode plate and the negative electrode plate, and an electrolytic solution. The positive electrode plate includes the positive electrode active material according to the first aspect of the present application. The method for preparing the lithium-ion battery is known to a person skilled in the art. For example, the positive electrode plate, the separator, and the negative electrode plate may each be a laminate, so as to be suitable for being stacked sequentially after being cut to a target size. The laminate may be wound to a target size to form a battery cell, and may be further combined with the electrolytic solution to form a lithium-ion battery.

In the lithium-ion battery, the positive electrode plate generally includes a positive electrode current collector and a positive electrode material layer located on the positive electrode current collector. The positive electrode material layer may include a positive electrode active material according to the first aspect of the present application, a binder, and a conductive agent. A person skilled in the art may choose an appropriate method to prepare the positive electrode plate. For example, the method may include the following steps: mixing the positive electrode active material, the binder, the conductive agent to form a slurry, and coating the positive electrode current collector with the slurry. The binder generally includes a fluorine-containing polyolefin-based binder. Compared with the fluorine-containing polyolefin-based binder, water is generally a good solvent. That is, the fluorine-containing polyolefin-based binder is generally highly soluble in water. For example, the fluorine-containing polyolefin-based binder may be, but without limitation, polyvinylidene fluoride (PVDF), a vinylidene fluoride copolymer, or a modified derivative thereof (for example, modified carboxylic acid, acrylic acid, or acrylonitrile). In the positive electrode material layer, a mass percent content of the binder may be a specific value. Due to a low conductivity of the binder itself, the dose of the binder needs to be not too high. Exemplarily, the mass percent content of the binder in the positive electrode active substance layer is less than or equal to 2 wt %, so as to achieve a relatively low electrode plate impedance. The conductive agent of the positive electrode plate may be any of various conductive agents applicable to a lithium-ion (secondary) battery in this field. For example, the conductive agent may be, but without limitation, one or more of acetylene black, conductive carbon black, vapor grown carbon fiber (VGCF), or Ketjen black. The weight of the conductive agent may be 1 wt %-10 wt % of the total mass of a positive electrode material layer. Desirably, a weight ratio of the conductive agent to the positive electrode active substance in the positive electrode plate is greater than or equal to 1.5:95.5.

In the lithium-ion battery, the positive electrode current collector of the positive electrode plate generally may be a laminate. The positive electrode current collector is generally a structure or part that can collect current. The positive electrode current collector may be any of various materials suitable for use as a positive electrode current collector of a lithium-ion battery in this field. For example, the positive electrode current collector may be, but without limitation, a metal foil. More specifically, the positive electrode current collector may be, but without limitation, a copper foil or an aluminum foil.

In the lithium-ion battery, the negative electrode plate generally includes a negative electrode current collector and a negative electrode active substance layer located on a surface of the negative electrode current collector. The negative electrode active substance layer generally includes a negative electrode active substance. The negative electrode active substance may be any of various materials suitable for serving as a negative electrode active substance of a lithium-ion battery in this field, for example, may be but without limitation one or more of graphite, soft carbon, hard carbon, vapor grown carbon fiber, mesocarbon microbead, silicon-based material, tin-based material, lithium titanate oxide, or other metals that can combine with lithium into an alloy. The graphite may be selected from one or more of artificial graphite, natural graphite, or modified graphite. The silicon-based material may be selected from one or more of elemental silicon, a silicon-oxygen compound, a silicon-carbon composite, or a silicon alloy. The tin-based material may be selected from one or more of elemental tin, a tin-oxide compound, or a tin alloy. The negative electrode current collector is generally a structure or part that collects current. The negative electrode current collector may be any of various materials suitable for use as a negative electrode current collector of a lithium-ion battery in this field. For example, the negative electrode current collector may be, but without limitation, a metal foil. More specifically, the negative electrode current collector may be, but without limitation, a copper foil.

In the lithium-ion battery, the separator may be any of various materials suitable for use as a separator of a lithium-ion battery in this field. For example, the separator may be, but without limitation, one or more of polyethylene, polypropylene, polyvinylidene fluoride, aramid fiber, polyethylene terephthalate, polytetrafluoroethylene, polyacrylonitrile, polyimide, polyamide, polyester, or natural fiber.

In the lithium-ion battery, the electrolytic solution may be any of various electrolytic solutions applicable to the lithium-ion battery in this field. For example, the electrolytic solution generally includes an electrolyte and a solvent. The electrolyte may generally include a lithium salt and the like. More specifically, the lithium salt may be an inorganic lithium salt and/or an organic lithium salt or the like. Specifically, the lithium salt may be, but without limitation, one or more of $LiPF_6$, $LiBF_4$, $LiN(SO_2F)_2$ (LiFSI for short), $LiN(CF_3SO_2)_2$ (LiTFSI for short), $LiClO_4$, $LiAsF_6$, $LiB(C_2O_4)_2$ (LiBOB for short), or $LiBF_2C_2O_4$ (LiDFOB for short). For another example, a concentration of the electrolyte may be 0.8 mol/L-1.5 mol/L. The solvent may be any of various solvents applicable to the electrolytic solution of the lithium-ion battery in this field. The solvent of the electrolytic solution is generally a nonaqueous solvent, exemplarily an organic solvent. Specifically, the solvent may be, but without limitation, one or more of ethylene carbonate, propylene carbonate, butylene carbonate, pentene carbonate, dimethyl carbonate, diethyl carbonate, dipropyl carbonate, ethyl methyl carbonate, or a halogenated derivative thereof.

The following describes the implementation of the present application with reference to specific embodiments. A person skilled in the art can easily understand other advantages and effects of the present application from the content disclosed in this specification. The present application may also be implemented or applied in other different manners. From a perspective of different viewpoints and applications, details in this specification may be modified or changed without departing from the spirit of the present application.

It needs to be noted that unless otherwise explicitly specified herein, process equipment or apparatuses mentioned in the following embodiments are conventional equipment or apparatuses in the art.

In addition, understandably, unless otherwise specified herein, a combination of one or more method steps mentioned in the present application shall not preclude other method steps existent before or after the combination of steps, or preclude other method steps from being inserted between the explicitly mentioned steps. Further, understandably, unless otherwise specified herein, a combination or connection relationship between one or more devices/apparatuses mentioned herein shall not preclude other devices/apparatuses existent before or after the combined devices/apparatuses, or preclude other devices/apparatuses from being inserted between two devices/apparatuses explicitly mentioned herein. Moreover, unless otherwise specified, reference numerals of the method steps are intended only for ease of identification rather than for limiting the arrangement order of the method steps or for limiting the scope of applicability of the present application. Any change or adjustment to the relative relationship between the reference numerals shall fall within the scope of applicability of the present application to the extent that no substantive change is made to the technical content hereof.

All the batteries in the embodiments are prepared according to the following methods.

(1) Preparing a Positive Electrode Material

Step 1: Preparing a substrate precursor.

Step 2: Placing the substrate precursor prepared in step 1, an Li-containing compound, an Me-containing compound, and a Y-containing compound in a mixing device for mixing, and then placing the mixture in a controlled atmosphere furnace for sintering to obtain a substrate of a positive electrode material.

Step 3: Placing the substrate of the positive electrode active material and a specific content of a compound that contains a coating element into a mixing device for mixing, and then placing the mixture in a controlled atmosphere furnace for sintering to form a coating layer of the positive electrode active material, thereby obtaining a finished positive electrode material.

(2) Preparing a Positive Electrode Plate

Step 1: Mixing the positive electrode material, polyvinylidene fluoride as a binder, and acetylene black as a conductive agent at a mass ratio of 98:1:1, adding the mixture into an N-methylpyrrolidone (NMP) solvent, and homogeneously stirring the mixture with a vacuum mixer to obtain a positive electrode slurry; and coat an electrode plate with the positive electrode slurry homogeneously until an areal density reaches 0.1 $mg/mm^2$-0.3 $mg/mm^2$.

Step 2: Drying the coated electrode plate in a 100° C.-130° C. oven, and performing cold calendering and slitting to obtain a positive electrode plate.

(2) Preparing a Negative Electrode Plate

Mixing graphite as a negative electrode active material, sodium carboxymethyl cellulose as a thickener, styrene butadiene rubber as a binder, and acetylene black as a conductive agent at a mass ratio of 97:1:1:1, and adding the mixture into deionized water; stirring the mixture with a vacuum mixer to obtain a negative electrode slurry; coating an 8 μm-thick copper foil with the negative electrode slurry homogeneously until an areal density reaches 0.05 $mg/mm^2$-0.15 $mg/mm^2$; drying the copper foil in the air under a room temperature, and then leaving the copper foil in a 120° C. oven for drying for 1 hour, and then performing cold calendering and slitting to obtain a negative electrode plate.

(3) Manufacturing an Electrolytic Solution

Selecting an organic solvent that is a mixed solution containing vinylene carbonate (EC), ethyl methyl carbonate (EMC), and diethyl carbonate (DEC), where a volume ratio between the EC, the EMC and the DEC is 20:20:60. Dissolving, in an argon-atmosphere glovebox with a water content of less than 10 ppm, a $LiPF^6$ lithium salt in the organic solvent, and mixing the lithium salt homogeneously to obtain an electrolytic solution, where a concentration of the lithium salt is 1 mol/L.

(4) Preparing a Separator

Selecting a 12 µm-thick polypropylene separator.

(5) Preparing a Battery

Stacking the positive electrode plate, the separator, and the negative electrode plate neatly so that the separator is located between the positive electrode plate and the negative electrode plate for a separation purpose; winding the stacked materials into a rectangular bare cell, putting the bare cell into an aluminum laminated film package, drying the package under 80° C. to remove moisture, injecting a corresponding nonaqueous electrolytic solution, performing sealing, and performing the steps such as standing, hot/cold calendering, formation, reshaping, capacity grading to obtain a finished battery.

Embodiment 1

In step (1) above in which the positive electrode material is prepared, specific steps are as follows:

1) Preparing a Substrate Precursor

Mixing nickel sulfate, manganese sulfate, and cobalt sulfate at a molar ratio of 8:1:1 to prepare a solution with a concentration of 1 mol/L; and using a hydroxide co-precipitation technology to prepare a large-particle-size lithium nickel transition metal oxide A as a precursor $Ni_{0.8}Co_{0.1}Mn_{0.1}(OH)_2$. In the process of preparing the precursor, the particle diameter of particles is controlled by controlling a reaction time, a pH value during co-precipitation, and an ammonia concentration.

2) Preparing a Lithium Nickel Transition Metal Oxide A (Polycrystalline $LiNi_{0.8}Co_{0.1}Mn_{0.1}O_2$)

Placing the large-particle nickel-cobalt-manganese ternary material precursor $Ni_{0.8}Co_{0.1}Mn_{0.1}(OH)_2$ and a lithium-containing compound $LiOH \cdot H_2O$ into a mixing device for mixing, and then leaving the mixture in a controlled atmosphere furnace for sintering under 800° C.; cooling the mixture, and grinding the mixture mechanically to obtain a substrate of the ternary material; placing the substrate of the positive electrode active material and a 0.3 wt % $Al_2O_3$ additive in the mixing device for mixing, and then leaving the mixture in the controlled atmosphere furnace for sintering under 450° ° C. to form a coating layer of the positive electrode active material, so that a finished material is obtained.

Embodiments 2-14

The preparation method of the positive electrode material in Embodiments 2-14 is basically the same as that in Embodiment 1 except the following: using a different relative content of Ni, Co, Mn, and Al elements in the precursor to prepare a substrate of different components; adjusting the reaction time, the pH value during co-precipitation, and the ammonia concentration, and changing the size of the primary particles and the secondary particles; and changing the types of substances in the coating layer, the content of the coating layer, and a heat treatment temperature. The specific characteristics of the positive electrode material in the foregoing embodiments are shown in Table 1. Finally, the positive electrode material in Embodiments 2-14 is obtained.

Comparative Embodiment 1

The preparation method in Comparative Embodiment 1 is similar to that in Embodiment 1 described above, except that the surface of a sample in the comparative embodiment is coated with $V_2O_5$.

Comparative Embodiment 2

The preparation method in Comparative Embodiment 2 is similar to that in Embodiment 17 described above, except that the surface of a sample in the comparative embodiment is coated with $Fe_2O_3$.

Comparative Embodiment 3

The preparation method in Comparative Embodiment 3 is similar to that in Embodiment 17 described above, except that in the sample coating process in the comparative embodiment, the sintering temperature of the added $Al_2O_3$ additive is 600° C.

Test Methods (1) Testing a Powder Resistivity

Testing the powder resistivity of the positive electrode materials prepared in each embodiment and comparative embodiment according to the following test methods:

Measuring the powder resistivity of the positive electrode active substance under a 12 MPa pressure by using a four-probe method. The test method includes: adding 0.4 g of positive electrode active substance powder to a sample mold (with an inner diameter of 11.28 mm); using a mechanical press to exert a 12 MPa pressure on the powder; and reading, after the pressure is stable, the powder resistivity of the positive electrode active substance under a 12 MPa pressure by using a resistivity meter. Table 1 shows test results in Embodiments 1-14 and Comparative Embodiments 1-3.

(2) Testing Cycle Performance of the Lithium-Ion Battery Under 45° C.

Charging the lithium-ion battery to 4.2 V with a 1 C current under 2.8 V-4.2 V in a 45° C. constant temperature environment, and then charging the battery to a current not greater than 0.05 mA under a 4.2 V constant voltage; leaving the battery to stand for 5 minutes, then discharging the battery to 2.8 V with a 1 C current, and recording the capacity as Dn (n=0, 1, 2 . . . ). Repeating the foregoing process until the capacity fades to 80% of an initial capacity, and recording the number of cycles of the lithium-ion battery. Table 2 shows test results in Embodiments 1-14 and Comparative Embodiments 1-3.

(3) Testing a Discharge Capacity of the Lithium-Ion Battery

Charging the lithium-ion battery to 4.2 V with a 1 C current under 2.8 V-4.2 V in a 25° C. constant temperature environment, and then charging the battery to a current not greater than 0.05 mA under a 4.2 V constant voltage; leaving the battery to stand for 5 minutes, then discharging the battery to 2.8 V with a 1 C current, and recording the capacity of the lithium-ion battery. Table 2 shows the detailed results.

TABLE 1

| | | Coating | | Powder characteristics of positive electrode material | | | |
|---|---|---|---|---|---|---|---|
| | Substrate | Content of coating element per unit volume (Mv) ($\mu g/cm^3$) | Substance | Size of primary particle ($\mu m$) | Secondary particle (Dv50) ($\mu m$) | BET ($m^2/g$) | Powder resistivity ($\Omega \cdot cm$) |
| Embodiment 1 | $LiNi_{0.8}Co_{0.1}Mn_{0.1}O_2$ | 14100 | $Al_2O_3$ | 0.3 | 11.2 | 0.63 | 864 |
| Embodiment 2 | $LiNi_{0.8}Co_{0.1}Mn_{0.1}O_2$ | 9400 | $TiO_2$ | 0.3 | 12.1 | 0.60 | 567 |
| Embodiment 3 | $LiNi_{0.8}Co_{0.1}Mn_{0.1}O_2$ | 4700 | $BaO$ | 0.3 | 10.9 | 0.65 | 764 |
| Embodiment 4 | $LiNi_{0.8}Co_{0.1}Mn_{0.1}O_2$ | 23500 | $ZrO_2$ | 0.3 | 13.6 | 0.57 | 952 |
| Embodiment 5 | $LiNi_{0.8}Co_{0.1}Mn_{0.1}O_2$ | 350 | $MgO$ | 0.3 | 13.2 | 0.58 | 655 |
| Embodiment 6 | $LiNi_{0.83}Co_{0.15}Al_{0.02}O_2$ | 14100 | $H_3BO_3$ | 0.3 | 14.3 | 0.52 | 543 |
| Embodiment 7 | $LiNi_{0.9}Co_{0.04}Mn_{0.04}Al_{0.02}O_2$ | 14100 | $Y_2O_3$ | 0.3 | 13.2 | 0.56 | 598 |
| Embodiment 8 | $LiNi_{0.70}Co_{0.15}Mn_{0.15}O_2$ | 7050 7050 | $Al(OH)_3$ $P_2O_5$ | 0.3 | 15.2 | 0.50 | 989 |
| Embodiment 9 | $LiNi_{0.8}Co_{0.1}Mn_{0.1}O_2$ | 7050 7050 | $Co(OH)_2$ $P_2O_5$ | 0.3 | 15.5 | 0.46 | 887 |
| Embodiment 10 | $LiNi_{0.8}Co_{0.1}Mn_{0.1}O_2$ | 14100 | $Al(OH)_3$ | 0.3 | 13.4 | 0.56 | 1011 |
| Embodiment 11 | $LiNi_{0.8}Co_{0.1}Mn_{0.1}O_2$ | 14100 | $SiO_2$ | 0.3 | 11.0 | 0.60 | 1653 |
| Embodiment 12 | $LiNi_{0.8}Co_{0.1}Mn_{0.1}O_2$ | 15100 | $Al_2O_3$ | 0.2 | 5.3 | 0.80 | 1021 |
| Embodiment 13 | $LiNi_{0.8}Co_{0.1}Mn_{0.1}O_2$ | 11100 | $Al_2O_3$ | 0.8 | 12.6 | 0.40 | 785 |
| Embodiment 14 | $LiNi_{0.8}Co_{0.1}Mn_{0.1}O_2$ | 9500 | $Al_2O_3$ | 0.5 | 15.1 | 0.30 | 769 |
| Comparative Embodiment 1 | $LiNi_{0.8}Co_{0.1}Mn_{0.1}O_2$ | 6000 | $V_2O_5$ | 0.3 | 10.7 | 0.60 | 6741 |
| Comparative Embodiment 2 | $LiNi_{0.9}Co_{0.04}Mn_{0.04}Al_{0.02}O_2$ | 7000 | $Fe_2O_3$ | 0.3 | 10.2 | 0.74 | 7531 |
| Comparative Embodiment 3 | $LiNi_{0.9}Co_{0.04}Mn_{0.04}Al_{0.02}O_2$ | 14100 | $Al_2O_3$ | 0.3 | 10.4 | 0.66 | 7832 |

TABLE 2

| | Number of cycles | Capacity (mAh/g) |
|---|---|---|
| Embodiment 1 | 1243 | 195 |
| Embodiment 2 | 1124 | 196 |
| Embodiment 3 | 1097 | 196 |
| Embodiment 4 | 976 | 192 |
| Embodiment 5 | 1024 | 198 |
| Embodiment 6 | 1430 | 195 |
| Embodiment 7 | 845 | 200 |
| Embodiment 8 | 1523 | 187 |
| Embodiment 9 | 1321 | 194 |
| Embodiment 10 | 1345 | 195 |
| Embodiment 11 | 1109 | 194 |
| Embodiment 12 | 1096 | 197 |
| Embodiment 13 | 1312 | 194 |
| Embodiment 14 | 1255 | 192 |
| Comparative Embodiment 1 | 445 | 193 |
| Comparative Embodiment 2 | 453 | 200 |
| Comparative Embodiment 3 | 421 | 199 |

As can be seen from the table above, although the discharge capacity of the lithium-ion battery with the positive electrode material in Embodiments 1-14 is basically the same as that in Comparative Embodiments 1-3, the powder resistivity of the positive electrode material in Embodiments 1-14 is significantly lower than that in Comparative Embodiments 1-3. Therefore, the cycle performance of the corresponding lithium-ion battery is significantly higher than that in Comparative Embodiments 1-3. The type of the coating material, the content of the coating element per unit volume, and the preparation process of the coating layer exert an impact on an ion conductivity and an electron conductivity of the coating layer, and on a surface status of the positive electrode material, and exert a great impact on the powder resistivity of the positive electrode material. As can be seen from Embodiments 1-5, by means of adjustment of the content of the coating element in the secondary particles per unit volume, the powder resistivity of the positive electrode material is further improved, and the cycle performance of the lithium-ion battery is further enhanced. In addition, when the surface of the positive electrode material is coated with two different coating elements, the two coatings are homogeneously distributed on the surface of the positive electrode material to preclude side reactions between the positive electrode material and the electrolytic solution. This also ensures a low powder resistivity of the positive electrode material, enhances surface stability, causes the surface of the positive electrode material to be both highly ion-conductive and highly electron-conductive, and achieves better cycle performance.

In conclusion, the present application effectively overcomes various disadvantages in the prior art and is of high commercialization value.

The embodiments described above are only an exemplary description of the principles and effects of the present application, but are not intended to limit the present application. A person skilled in the art can modify or change the above embodiments without departing from the spirit and scope of the present application. Therefore, any equivalent modification or change made by a person of ordinary skill in the art without departing from the spirit and technical principles of the present application shall fall within the protection scope of the claims of the present application.

What is claimed is:

1. A positive electrode material comprising:
   a substrate comprising secondary particles, wherein each secondary particle comprises a plurality of primary particles packed together, a molecular formula of the substrate is $Li_xNi_yCO_zMn_kAl_pO_rA_m$, $0.95 \leq x \leq 1.05$, $0.70 \leq y \leq 0.98$, $0 < z \leq 0.2$, $0 < k \leq 0.2$, $0 \leq p \leq 0.05$, $1 < r \leq 2$, $0 \leq m \leq 2$, $m+r \leq 2$, A is selected from F, Cl, Br, and any combinations thereof;
   a coating layer disposed on a surface of the substrate, wherein the coating layer comprises an oxide of a coating element selected from Al, Ba, Zn, Ti, Zr, Mg, Y, Si, B, Co, P, and any combinations thereof,
wherein a powder resistivity ρ of the positive electrode material under a 12 MPa pressure is 500 Ω*cm-2,000 Ω*cm.

2. The positive electrode material of claim 1, wherein the powder resistivity ρ of the positive electrode material under a 12 MPa pressure is 543 Ω*cm-1,653 Ω*cm.

3. The positive electrode material of claim 1, wherein a content Mv of the coating element per unit volume of the positive electrode material is 400 μg/cm$^3$ to 15,000 μg/cm$^3$.

4. The positive electrode material of claim 3, wherein the content Mv of the coating element per unit volume of the positive electrode material is 800 μg/cm$^3$ to 10,000 μg/cm$^3$.

5. The positive electrode material of claim 3, wherein the powder resistivity ρ and the content Mv of the coating element satisfy: ρ/Mv≤1 Ω*cm$^4$/μg.

6. The positive electrode material of claim 5, wherein the powder resistivity ρ and the content Mv of the coating element satisfy: ρ/Mv≤0.5 Ω*cm$^4$/μg.

7. The positive electrode material of claim 1, wherein the coating element is selected from at least two of the group consisting of Al, Ba, Zn, Ti, Zr, Mg, Y, Si, B, Co, and P.

8. The positive electrode material of claim 1, wherein the coating element is distributed on a surface of at least a part of the primary particles inside the secondary particles and distributed at grain boundaries between adjacent primary particles.

9. The positive electrode material of claim 1, wherein a content of the coating element in the oxide coating layer is 60 wt % or more, based on a total content of the coating element in the positive electrode material.

10. The positive electrode material of claim 1, wherein in the molecular formula of the substrate, 0.80≤y≤0.98, 0<z≤0.1, 0<k≤0.1, and 0≤p≤0.03.

11. The positive electrode material of claim 1, wherein Dv50 of the secondary particles is 5 μm-18 μm, the primary particles have an average particle diameter of 0.1 μm-1 μm.

12. The positive electrode material of claim 1, wherein a specific surface area of the positive electrode material is 0.1 m$^2$/g-0.8 m$^2$/g.

13. The positive electrode material of claim 1, wherein a content of $Li_2CO_3$ in residual lithium on a surface of the positive electrode material is less than 3,000 ppm, and a content of LiOH in the residual lithium on the surface of the positive electrode material is less than 5,000 ppm.

14. The positive electrode material of claim 13, wherein in the residual lithium on the surface of the positive electrode material, the content of $Li_2CO_3$ is less than the content of LiOH.

15. A method for preparing a positive electrode material, the method comprising:
forming a substrate, wherein the substrate comprises secondary particles, the secondary particle comprises a plurality of primary particles packed together, a molecular formula of the substrate is 0.70≤ y≤0.98, 0<z≤0.2, 0<k≤0.2, 0≤p≤0.05, 1≤r≤2, 0≤m≤2, m+r≤2, A is selected from F, Cl, Br, and any combinations thereof; and
forming a coating layer on a surface of the substrate, wherein the coating layer comprises an oxide of a coating element selected from Al, Ba, Zn, Ti, Zr, Mg, Y, Si, B, Co, P, and any combinations thereof,
wherein a powder resistivity ρ of the positive electrode material under a 12 MPa pressure is 500 Ω*cm-2,000 Ω*cm.

16. The method of claim 15, wherein forming the substrate further comprises:
forming a mixture of a lithium source and a metal source, wherein the metal source comprises a metal element selected from the group consisting of Ni, Co, Mn, Al, and any combinations thereof; and
sintering the mixture.

17. The method of claim 16, wherein the metal source is selected from the group consisting of $Ni_{0.5}Co_{0.2}Mn_{0.3}(OH)_2$, $Ni_{0.5}Co_{0.25}Mn_{0.25}(OH)_2$, $Ni_{0.55}Co_{0.15}Mn_{0.3}(OH)_2$, $Ni_{0.55}Co_{0.1}Mn_{0.35}(OH)_2$, $Ni_{0.55}Co_{0.05}Mn_{0.4}(OH)_2$, $Ni_{0.6}Co_{0.2}Mn_{0.2}(OH)_2$, $Ni_{0.75}Co_{0.1}Mn_{0.15}(OH)_2$, $Ni_{0.8}Co_{0.1}Mn_{0.1}(OH)_2$, $Ni_{0.88}Co_{0.05}Mn_{0.07}(OH)_2$, $0.9Ni_{0.8}Co_{0.2}(OH)_2·0.1Al_2(OH)_3$, $0.9Ni_{0.9}Co_{0.05}Mn_{0.05}(OH)_2·0.1Al_2(OH)_3$, and any combinations thereof,
wherein the lithium source is selected from the group consisting of $LiOH·H_2O$, LiOH, $Li_2CO_3$, $Li_2O$, and any combinations thereof.

18. The method of claim 16, wherein the sintering is performed at a temperature of 800° C. with an oxygen concentration greater than or equal to 20%.

19. The method of claim 15, wherein forming the coating layer further comprises:
mixing the substrate with a compound containing the coating element, wherein the compound is selected from the group consisting of $Al_2O_3$, ZnO, $ZrO_2$, $TiO_2$, MgO, $WO_3$, $Y_2O_3$, $Co_2O_3$, $Ba(NO_3)_2$, $Co_2O_3$, $P_2O_5$, $H_3BO_3$, and any combinations thereof; and
sintering the mixed substrate and compound.

20. The method of claim 15, wherein the coating element has a dosage from 0.01 wt % to 0.5 wt %, based on a mass of the substrate, and sintering the mixed substrate and compound is performed at a temperature from 200° C.-700° C.

* * * * *